United States Patent [19]
Fooladi

[11] 3,901,940
[45] Aug. 26, 1975

[54] UNSYM P-PHENYLENE-DICARBAMATE

[76] Inventor: Mike Mehadi Fooladi, Apt. 4-B, Oakmont Manor Apts., Vicksburg, Miss. 39180

[22] Filed: Oct. 29, 1974

[21] Appl. No.: 518,805

[52] U.S. Cl. ............................ 260/471 C; 424/300
[51] Int. Cl.² .................................... C07C 125/06
[58] Field of Search ................... 260/471 C

[56] References Cited
UNITED STATES PATENTS
3,671,571  6/1972  Koenig et al. .................. 260/471 C

*Primary Examiner*—James A. Patten
*Assistant Examiner*—L. A. Thaxton

[57] ABSTRACT

A new dicarbamic acid ester compound, particularly compound processing fungicidal activity, is prepared. The compound particularly described is Unsym. p-Phenylene-N,N'-Methyl Phenyl Dicarbamate. The method of producing said compound is described.

1 Claim, No Drawings

UNSYM P-PHENYLENE-DICARBAMATE

This invention relates to a new compound, namely, Unsym. p-Phenylene-N,N'-Methyl Phenyl Dicarbamate, and its use as a fungicide in agricultural formulation. More specifically, this invention relates to a compound having the following structural formula:

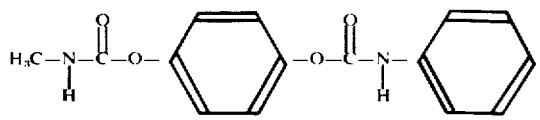

The said invention compound may be prepared by reacting one part of unsubstituted hydroquinone with one part of phenylisocyanate and one part of methylisocyanate in an inert solvent such as benzene, toluene, chloroform, or carbontetrachloride. This new compound may also be prepared by reacting one part of unsubstituted hydroquinone with two parts of phosgene followed by reaction of the resulting intermediate with one part of methyl amine and one part of phenyl amine in an inert solvent.

The following example is illustrative of the preparation of the invention compound.

EXAMPLE I

Preparation of Unsymp. p-Phenylene-N,N'-Methyl Phenyl-Dicarbamate: A mixture of hydroquinone (11.0 g; 0.1 mole), phenylisocyanate (12.0 g; 0.1 mole), methylisocyanate (6.0 g; 0.1 mole) and 100 ml benzene was stirred and refluxed for twenty-four hours. The mixture cooled; then, poured into 300 ml of cold water while stirring. The resulting white solid material filtered, and dried to give 26.0 grams of Unsym. p-Phenylene-N,N'-Methyl Phenyl Dicarbamate, M.P. 198°C – 200°C.

Analysis for $C_{15}H_{14}N_2O_4$: Cal. C, 62.94%; H, 4.89%; N, 9.79%. Found: C, 62.90%; H, 4.99%; N, 9.50%.

I claim:

1. Dicarbamate acid ester compound having the formula

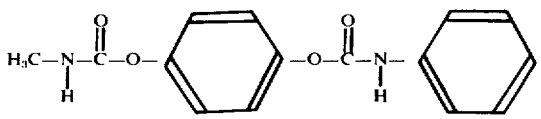

* * * * *